July 11, 1961 S. T. MEYERS 2,992,339

BINARY ADDER CIRCUITS

Filed Nov. 27, 1956 2 Sheets-Sheet 1

INVENTOR
S. T. MEYERS
BY R. B. Ardis
ATTORNEY

July 11, 1961 S. T. MEYERS 2,992,339

BINARY ADDER CIRCUITS

Filed Nov. 27, 1956 2 Sheets-Sheet 2

INVENTOR
S. T. MEYERS
BY R. B. Ardis
ATTORNEY

United States Patent Office 2,992,339

Patented July 11, 1961

2,992,339

BINARY ADDER CIRCUITS

Stanley T. Meyers, East Orange, N.J., assignor to Bell Telephone Laboratories, Incorporated, New York, N.Y., a corporation of New York Filed Nov. 27, 1956, Ser. No. 624,653

11 Claims. (Cl. 307—88.5)

This invention relates generally to circuits for use in pulse type systems for the transmission of intelligence and more particularly, although in its broader aspects not exclusively, to circuits of the type used in digital computers.

A principal object of the invention is to simplify the circuitry required for adding a pair of single digit binary numbers.

Another and more particular object is to avoid any necessity for the use of such active devices as vacuum tubes or transistors in a simple binary adder, comparator, or disparity recognizer.

A complete circuit for the addition of binary numbers is generally arranged with at least three inputs, corresponding respectively to addend, augend, and carry, and at least two outputs, corresponding respectively to sum and new carry. In many areas of the pulse communication art, however, the term "binary adder" has a broader significance and encompasses not only the type of circuit described above but also any pulse-type circuit having a pair of input terminals and a single output terminal which provides one output state whenever the two input states are alike and another output state whenever they are different. When used as part of an adder circuit of the type described above, such a device is sometimes known as a half adder. In addition, it has occasionally been given such descriptive appellations as comparator and disparity recognizer. It is, however, in the latter sense that the term "binary adder" is used throughout the remainder of the present specification. Thus, in binary language, an "adder" is a device which produces a (0) whenever the signals at its two input terminals are alike and a (1) whenever they are different. In their simplest form, a (1) can be represented by the presence of a pulse and a (0) by the absence of a pulse.

In its most general form, the present invention is a binary adder which combines two simultaneous binary input signals in phase opposition in its output circuit path, thus providing an output of (0) whenever the two inut signals are alike and an output of (1) whenever they are different. A minimum number of circuit components is required and any necessity for the use of such active gain producing elements as vacuum tubes or transistors is avoided, thereby introducing significant economies in systems in which a large number of binary adder circuits are employed. In addition, because only passive circuit elements are required, reliability is improved to a considerable extent.

A principal feature of the invention is a four-terminal bridge circuit having a diode connected in each of the four arms thereof and a storage device such as a capacitor or an inductor connected between one pair of diagonally opposite terminals. All of the diodes are poled for easy current flow from one toward the other of one pair of diagonally opposite terminals of the bridge circuit, forming a polarity guard to keep the output pulse always in the same direction regardless of the direction of the charge on the storage capacitor.

In accordance with another feature of the invention, binary input information in the form of unidirectional pulses is applied to each of one pair of diagonally opposite terminals of the bridge circuit, a regular succession of unidirectional timing pulses is applied to one of the remaining terminals, and binary output information is withdrawn from the other of the remaining terminals of the bridge circuit. During alternate states of the timing signal, the binary input information is applied to the two input terminals, leaving a net charge on the storage capacitor when the two input signals are different and leaving substantially no charge when they are alike, and the charge, if any, is drawn off into the signal output path.

Other objects and features of the invention will become apparent from a study of the following detailed description of the structure and operation of several specific embodiments. In the drawings.

Figure 1:
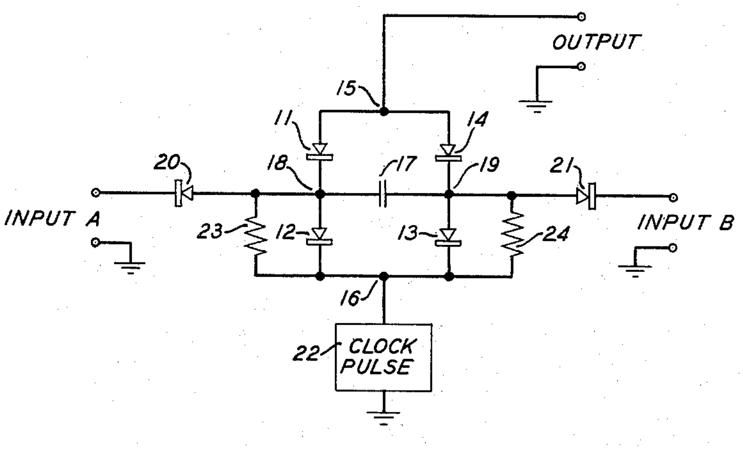
FIG. 1 illustrates a typical binary adder embodying the present invention.

In the embodiment of the invention illustrated in FIG. 1, the four-terminal bridge circuit is made up of four semiconductor diodes 11, 12, 13, and 14. As shown, all four diodes are connected for easy current flow from one 15 toward the other 16 of one pair of diagonally opposite terminals of the bridge. Diodes 12 and 13 may be replaced by resistors at the sacrifice of efficiency but, in general, their presence is desirable. The storage device featured by the invention is a capacitor 17 connected between the remaining two bridge terminals 18 and 19. Binary input information in the form of positive pulses is simultaneously applied to each of the two input circuits, labeled input A and input B respectively. For the illustrated diode polarities, the input pulses are positive-going and, by way of example, a (1) is represented by the presence of a pulse and a (0) by the absence of a pulse.

The ungrounded side of input A is connected to bridge terminal 18 in the embodiment of the invention shown in FIG. 1 through a semiconductor diode 20 which is poled to be biased in the reverse direction by an incoming positive-going signal pulse. The ungrounded side of input B is similarly connected to bridge terminal 19 through a diode 21 which is poled to be biased in the reverse direction by an incoming signal pulse. The timing or clock pulse source 22 is connected between bridge terminal 16 and ground, and the adder output is taken between bridge terminal 15 and ground. A pair of resistors 23 and 24 are connected in parallel with bridge diodes 12 and 13, respectively, to provide charging current for storage capacitor 17.

Figure 2:
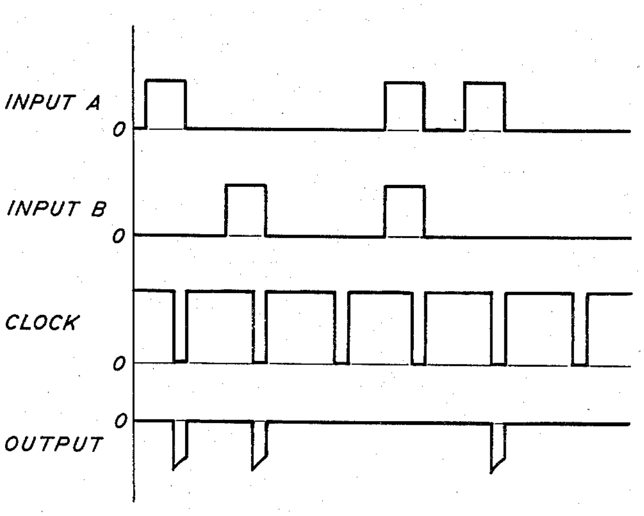
FIG. 2 shows input, timing, and output waveforms typical of the operation of the embodiment of the invention illustrated in FIG. 1.

The operation of the embodiment of the invention shown in FIG. 1 is illustrated by the waveforms shown in FIG. 2, where the first two lines represent binary input information applied to adder input cricuits A and B, respectively, the third line represents the output of clock pulse source 22, and the bottom line represents the output signal obtained across the signal output circuit for the illustrated combinations of input pulses. As has already been stated, the circuit arrangement featured by the present invention permits the two simultaneous inputs to be added in phase opposition in the signal output path. As a result, the output is (1) only when the inputs are (1) (0) or (0) (1), and is (0) when the inputs are (1) (1) or (0) (0).

As indicated by the relative heights of the waveforms of FIG. 2, the maximum or "on" magnitude of the clock pulses provided by source 22 is greater than the magnitude of the input pulses at inputs A and B. Diodes 20 and 21 are held closed by a forward current through resistors 23 and 24, therefore, whenever a positive clock pulse is present at bridge terminal 16. At the same time, the clock pulse potential holds bridge diodes 11, 12, 13, and 14 back biased. When there is a positive input potential on either input A or input B alone during the life of the positive clock pulse, the charge is stored on capacitor 17. When the output of clock pulse source 22 changes state, momentarily replacing the positive potential with ground potential, an output pulse is forced through the adder output circuit. Removal of their reverse biases opens up input diodes 20 and 21, and the charge stored on capacitor 17 is routed to the output circuit path through the diode bridge to give an output potential equal to that stored on capacitor 17. As illustrated in FIG. 2, the output pulse is a negative-going rather than a positive-going pulse. After a short interval, the zero potential state of the clock signal is replaced by the positive state and the next pair of simultaneous inputs is ready for addition.

For diodes and signal pulses of the polarity illustrated in FIGS 1 and 2, bridge diodes 12 and 14 are forced closed upon the removal of the positive potential at bridge terminal 16 whenever a charge has been stored on capacitor 17 as a result of a positive signal pulse at input A. At the same time, bridge diodes 11 and 13 are held open. A negative output pulse is routed to the output circuit of the adder in this manner. If a signal pulse appears at input B instead of input A, the charge on capacitor 17 is reversed and the negative-going output is obtained with bridge diodes 11 and 13 closed and bridge diodes 12 and 14 open. In this manner, the diode bridge featured by the invention functions as a polarity guard to keep the output pulses always in one direction, regardless of the direction in which the storage capacitor is charged. When the clock pulse returns to its positive state, the adder returns to its initial state to receive the next pair of simultaneous input signals.

As illustrated in FIG. 2, no output pulse is produced by the binary adder shown in FIG. 1 if an input pulse is either present or absent at both input A and input B simultaneously. Under these conditions, no net charge is stored on capacitor 17 during the interval in which the clock potential is positive and there is, hence, no stored charge to be dissipated in the adder output circuit during the interval in which the clock potential is at ground.

Figure 3:
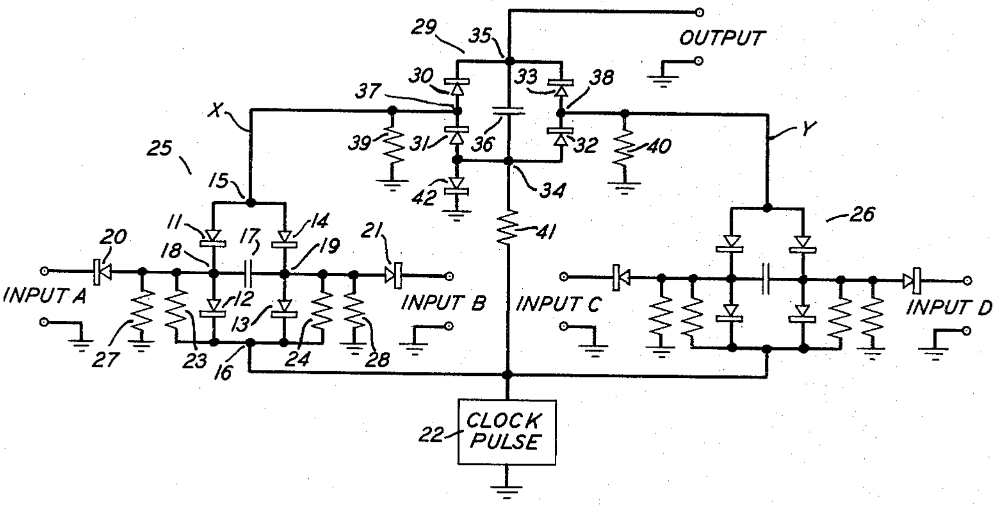
FIG. 3 illustrates an embodiment of the invention in which the outputs of two binary adders like that shown in FIG. 1 are combined in a third binary adder embodying the present invention.

The embodiment of the invention shown in FIG. 3 combines the outputs of two separate binary adders in a modulo two addition of the sums to give one final output signal. The net result is a positive-going output pulse during a positive interval of the clock pulse when an odd number of input pulses have been applied to the various input leads during the previous positive clock pulse interval. When either no input pulses or an even number of input pulses have been applied during the life of the previous positive clock pulse, no output pulse is produced.

The embodiment of the invention illustrated in FIG. 3 includes a pair of binary adders 25 and 26 which are both substantially identical to the one shown in FIG. 1. They utilize a common clock pulse source 22 and contain, in addition, a resistor 27 returned to ground from bridge terminal 18 and a resistor 28 returned to ground from bridge terminal 19. For convenience, the two input circuits of adder 25 are labeled inputs A and B, while those of adder 26 are labeled inputs C and D. The output lead from bridge terminal 15 in adder 25 is labeled X and that from the corresponding terminal in adder 26 is labeled Y.

In addition to binary adders 25 and 26, the circuit shown in FIG. 3 features still another binary adder circuit 29 embodying features of the present invention. As illustrated, it includes a four-terminal bridge circuit made up of four semiconductor diodes 30, 31, 32, and 33. All four diodes are poled for easy current flow from one 34 toward the other 35 of one pair of diagonally opposite terminals of the bridge. The storage device featured by the invention is a capacitor 36 connected between bridge terminals 34 and 35, and binary input information from adders 25 and 26 is supplied to the remaining two bridge terminals 37 and 38 by way of leads X and Y respectively. A pair of resistors 39 and 40 are returned to ground from bridge terminals 37 and 38, respectively. The signal output path for the entire adder circuit is connected between bridge terminal 35 and ground, while a resistor 41 is connected between bridge terminal 34 and the ungrounded side of clock source 22. A fifth semiconductor diode 42 is returned to ground from bridge terminal 34 and is poled for easy current flow in the direction toward ground.

Figure 4:
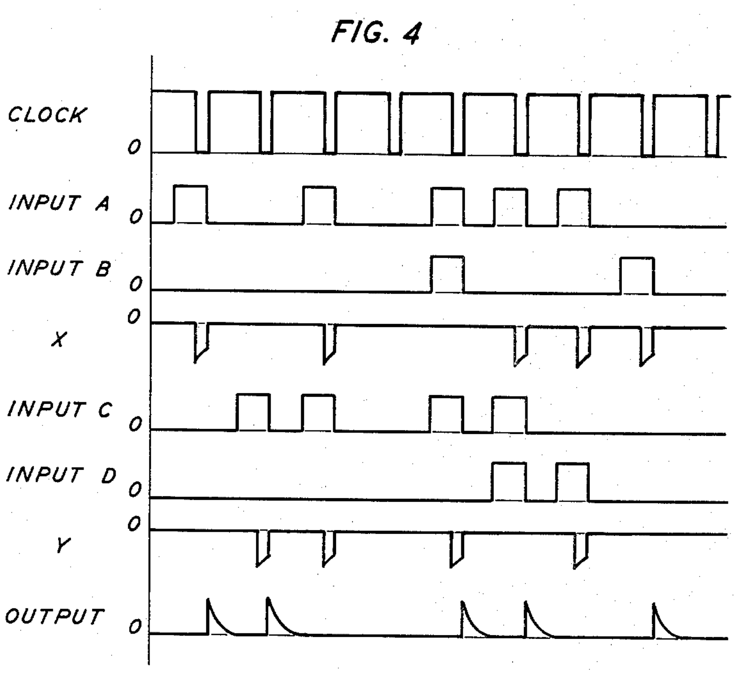
FIG. 4 shows input, timing, output, and several intermediate waveforms typical of the operation of the embodiment of the invention illustrated in FIG. 3.

The operation of the embodiment of the invention illustrated in FIG. 3 is shown by the waveforms of FIG. 4, where the first line represents the output of clock pulse source 22, the second two lines represents binary input information applied to inputs A and B, the fourth line represents the output of adder 25 on lead X, the next two lines represent binary input information applied to inputs C and D, the seventh line represents the output of adder 26 on lead Y, and the bottom line represents the final output signal of the circuit. As illustrated, an output pulse is obtained from adder 29 only following a positive clock pulse interval in which an odd number of input pulses have been applied to adders 25 and 26. At all other times the output from adder 29 is zero.

Binary adder circuits 25 and 26 function in the manner described in connection with FIG. 1, producing a negative-going pulse representing a (1) whenever their input states are unlike and produce a (0) whenever their input states are alike. Because the outputs of these two adders are combined in the third adder 29 to obtain the final output, the charge potentials on the storage capacitors 17 of adders 25 and 26 are stabilized so that they are substantially identical whenever they exist simultaneously. This is done by limiting the pulses which are passed by the input diodes 20 and 21 in the adders 25 and 26 to a predetermined fixed amplitude. Resistors 27 and 28, in association with resistors 23 and 24 and clock pulse source 22, establish the precise threshold potential required.

Any potentials established on the respective storage capacitors 17 as a result of asynchronous input pulse conditions are substantially the same during the interval in which the clock output is positive. At the same time, the diode bridges in adders 25 and 26 are both completely back biased. During the interval in which the clock output potential is zero, any potentials on either or both of the respective storage capacitors 17 are applied as inputs to the third adder 29, as shown in the fourth and seventh lines of FIG. 4. When there are charges on both capacitors, nothing is transferred to storage capacitor 36 in adder 29, since the charges are equal and opposite. When there is a charge on only one of the two storage capacitors 17, that charge is passed on to storage capacitor 36 during the interval in which the potential of the clock output is zero. Diode 42 is forced open during this interval. The bridge formed by diodes, 30, 31, 32, and 33 connects storage capacitor 36 to the output circuit path in such a manner that the charge is always deposited in the same direction, whether it originates in adder 25 or adder 26. The unidirectional output which occurs upon the return of the clock output to a positive potential is thereby ensured.

When the clock output returns to its positive value, diode 42 is closed by the current from source 22 through resistor 41. One side of storage capacitor 36 in adder 29 is thereby effectively grounded. The charge on capacitor 36 from an input pulse on either X or Y holds the diode bridge back biased and delivers a positive-going output potential to the output circuit path which represents the binary sum of the four inputs without a carry term. This output can be stored in a bistable circuit if necessary.

It is to be understood that the above-described arrangements are illustrative of the application of the principles of the invention. Numerous other arrangements may be devised by those skilled in the art without departing from the spirit and scope of the invention.

What is claimed is:

1. A binary adder which comprises a four-terminal bridge circuit having diodes connected in at least some of the arms thereof, said diodes being poled from one toward the other of a first pair of conjugate terminals of said bridge circuit, means to apply separate binary information in the form of unidirectional pulses to each of the second pair of conjugate terminals of said bridge circuit, means coupled between one of said pairs of terminals for storing the energy difference between the binary information present at one of said second pair of terminals and the binary information present at the other of said second pair of terminals; means to apply timing pulses to a predetermined one of said first pair of terminals alternately to bias said diodes in the reverse direction and remove said reverse biases, and means to abstract binary output information from the other of said first pair of terminals.

2. A binary adder in accordance with claim 1 in which said energy storage means comprises a reactive impedance connected between said first pair of terminals.

3. A binary adder in accordance with claim 1 in which said energy storage means comprises a capacitor connected between said first pair of terminals.

4. A binary adder which comprises a four-terminal bridge circuit having a diode connected in each of the four arms thereof, all of said diodes being poled from one to the other of a first pair of diagonally opposite terminals of said bridge circuit, means to apply separate binary information in the form of unidirectional pulses between each of the second pair of diagonally opposite terminals of said bridge circuit and a point of predetermined reference potential, a storage capacitor connected between one of said pairs of terminals, means to apply timing pulses between a predetermined one of said first pair of terminals and said point of reference potential alternately to bias said diodes in the reverse direction and remove said reverse biases, and means to abstract binary output information between the other of said first pair of terminals and said point of reference potential, whereby charges placed on said storage capacitor by unlike binary inputs forward bias said diodes in one pair of opposite arms of said bridge circuit during intervals when said reverse biases are removed and provide an output pulse across said output information abstraction means.

5. A binary adder which comprises a four-terminal bridge circuit having a diode connected in each of the four arms thereof, all of said diodes being poled from one to the other of a first pair of diagonally opposite terminals of said bridge circuit, means to apply separate binary information in the form of unidirectional pulses between each of the second pair of diagonally opposite terminals of said bridge circuit and a point of predetermined reference potential, a storage capacitor connected between said second pair of terminals, means to apply timing pulses having greater amplitude than said binary information pulses between one of said first pair of terminals and said point of reference potential alternately to bias said diodes in the reverse direction and remove said reverse biases, and means to abstract binary output information between the other of said first pair of terminals and said point of reference potential, whereby charges placed on said storage capacitor by unlike binary inputs forward bias said diodes in one pair of opposite arms of said bridge circuit during intervals when said reverse biases are removed and provide an output pulse across said output information abstraction means.

6. A binary adder in accordance with claim 5 in which said binary input information application means includes a pair of diodes each poled to receive a reverse bias from a binary input information pulse and connected to respective ones of said first pair of terminals to prevent input information pulses from charging said storage capacitor during intervals between timing pulses.

7. A binary adder in accordance with claim 5 which includes a pair of resistors connected in parallel with respective ones of said diodes between said second pair of terminals and the one of said first pair of terminals to which timing pulses are applied and in which said binary input information application means includes a pair of diodes each poled to receive a reverse bias from a binary input information pulse and connected to respective ones of said first pair of terminals to prevent input information pulses from charging said storage capacitor during intervals between timing pulses.

8. A binary adder which comprises a pair of input circuit paths, means to apply binary input information in the form of unidirectional pulses to both of said input circuit paths, an output circuit path, means to abstract binary output information in the form of unidirectional pulses from said output circuit path, and means periodically to combine the inputs in said input circuit paths simultaneously in phase opposition in said output circuit path in response to a timing pulse, whereby an output pulse appears in said output circuit path if an input pulse is present in only one of said input circuit paths prior to said timing pulse and an output pulse is absent if an input pulse is either present or absent simultaneously in both of said input circuit paths prior to said timing pulse.

9. A binary adder which comprises a four-terminal bridge circuit having a diode connected in each of the four arms thereof, all of said diodes being poled from one to the other of a first pair of diagonally opposite terminals of said bridge circuit, means to apply separate binary information in the form of unidirectional pulses between each of the second pair of diagonally opposite terminals of said bridge circuit and a point of predetermined reference potential, a storage capacitor connected between said first pair of terminals, means to apply timing pulses having greater amplitude than said binary information pulses between one of said first pair of terminals and said point of reference potential alternately to bias said diodes in the reverse direction and remove said reverse biases, and means to abstract binary output information between the other of said first pair of terminals and said point of reference potential, whereby charges placed on said storage capacitor by unlike binary inputs forward bias said diodes in one pair of opposite arms of said bridge circuit during intervals when said reverse biases are removed and provide an output pulse across said output information abstraction means.

10. A binary adder which comprises a four-terminal bridge circuit having diodes connected in at least some of the arms thereof, said diodes being poled from one toward the other of a first pair of conjugate terminals of said bridge circuit, means to apply separate binary information in the form of unidirectional pulses to each of the second pair of conjugate terminals of said bridge circuit, energy storage means in the form of a reactive impedance connected between said second pair of terminals, means to apply timing pulses to a predetermined one of said first pair of terminals alternately to bias said diodes in the reverse direction and remove said reverse biases, and means to abstract binary output information from the other of said first pair of terminals.

11. A binary adder which comprises a four-terminal bridge circuit having diodes connected in at least some of the arms thereof, said diodes being poled from one toward the other of a first pair of conjugate terminals of said bridge circuit, means to apply separate binary information in the form of unidirectional pulses to each of the second pair of conjugate terminals of said bridge circuit, energy storage means in the form of a capacitor connected between said second pair of terminals, means to apply timing pulses to a predetermined one of said first pair of terminals alternately to bias said diodes in the reverse direction and remove said reverse biases, and means to abstract binary output information from the other of said first pair of terminals.

References Cited in the file of this patent

UNITED STATES PATENTS

| | | |
|---|---|---|
| 2,694,521 | Newman | Nov. 16, 1954 |
| 2,765,115 | Beloungie | Oct. 2, 1956 |
| 2,775,714 | Curtis | Dec. 25, 1956 |
| 2,817,757 | Durbin | Dec. 24, 1957 |
| 2,827,573 | Eckert | Mar. 18, 1958 |
| 2,866,103 | Blake et al. | Dec. 23, 1958 |
| 2,892,099 | Gray | June 23, 1959 |

FOREIGN PATENTS

| | | |
|---|---|---|
| 494,847 | Italy | June 5, 1954 |